United States Patent [19]
Hirayama et al.

[11] Patent Number: 5,884,021
[45] Date of Patent: Mar. 16, 1999

[54] COMPUTER SYSTEM HAVING A CHECKPOINT AND RESTART FUNCTION

[75] Inventors: Hideaki Hirayama, Kawasaki; Kuniyasu Shimizu, Tokyo, both of Japan

[73] Assignee: Kabushiki Kaisha Toshiba, Kawasaki, Japan

[21] Appl. No.: 710,403

[22] Filed: Sep. 17, 1996

[30] Foreign Application Priority Data

Jan. 31, 1996 [JP] Japan ................................ 8-015660

[51] Int. Cl.$^6$ ........................................ G06F 11/00
[52] U.S. Cl. .......................... 395/182.11; 395/182.13
[58] Field of Search .................. 395/182.11, 182.13, 395/182.14, 183.1, 183.11, 733, 735, 739, 182.15, 591

[56] References Cited

U.S. PATENT DOCUMENTS

| | | | |
|---|---|---|---|
| 4,819,232 | 4/1989 | Krings ................................ 395/182.11 |
| 4,852,092 | 7/1989 | Makita ................................ 395/182.15 |
| 5,146,569 | 9/1992 | Yamaguchi et al. ..................... 395/569 |
| 5,301,309 | 4/1994 | Sugano .................................. 395/182.1 |
| 5,333,314 | 7/1994 | Masai et al. ............................ 707/202 |

OTHER PUBLICATIONS

Kai Li et al., "Checkpointing Multicomputer Applications," Proceedings of the Tenth Symposium on Reliable Distributed Systems, Sep. 30–Oct. 1–2, 1991, Pisa, Italy, pp.2–11.

Henry Clark et al., "DAWGS–A Distributed Compute Server Utilizing Idle Workstations," Journal of Parallel and Distributed Computing, vol. 14, No. 2, Feb. 1992, pp. 175–186.

Chung–Chi Jim Li et al., "CATCH–Compiler–Assisted Techniques for Checkpointing," International Symposium on Fault Tolerant Computing, Chapel Hill, North Carolina, Jun. 26–28, 1990, pp. 74–81.

*Primary Examiner*—Dieu-Minh Le
*Attorney, Agent, or Firm*—Finnegan, Henderson, Farabow, Garrett & Dunner, L.L.P.

[57] ABSTRACT

The present invention provides a computer system with an interruption resistance which construction costs are greatly reduced by eliminating lock-run-out sequence when restarting is performed. In a computer system with an interruption resistance, comprising a check point restart function, special process for taking check points are respectively provided for processors included in the computer system. When taking a check point, the special process for taking check points is brought into an ready state by a wake-up portion. After the special process for taking check points takes a check point, the special process for taking check points is brought into a sleep state again. In this manner, check points are not taken when executing an arbitrary process, and therefore, lock-run-out can be eliminated when restarting is performed.

21 Claims, 10 Drawing Sheets

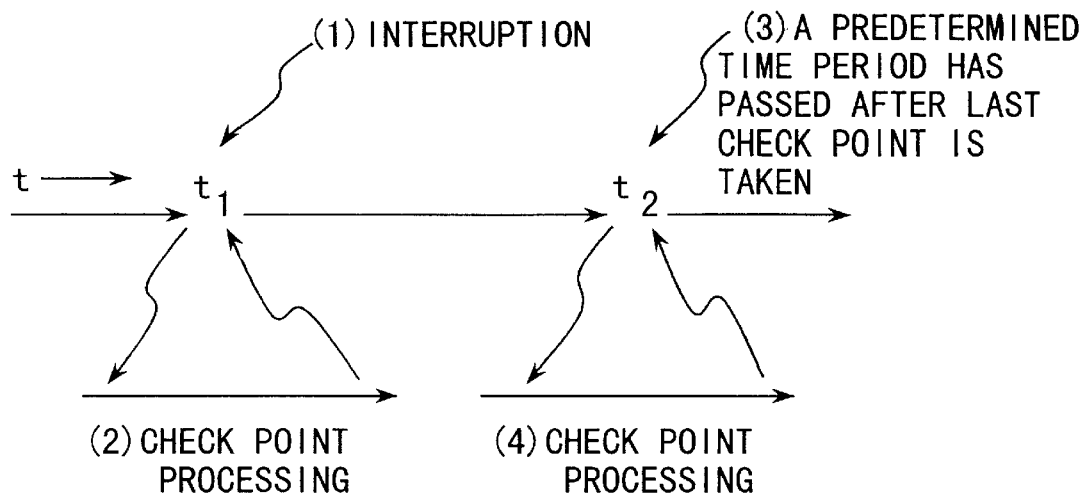
FIG. 1 (PRIOR ART)
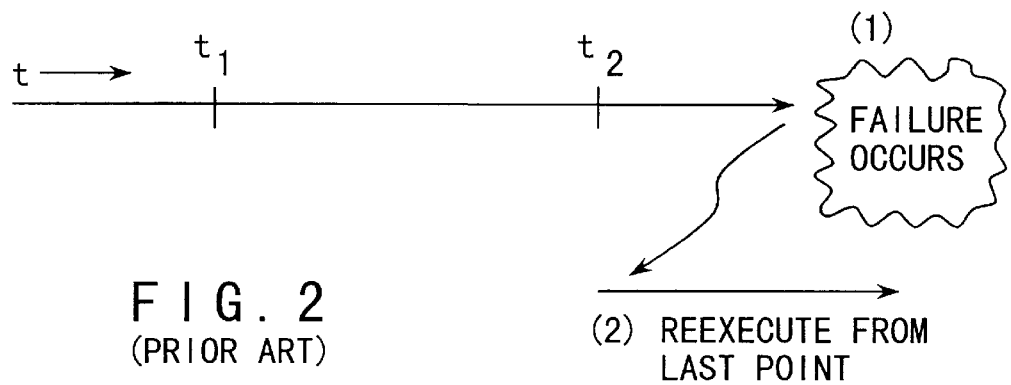
FIG. 2 (PRIOR ART)
| LEVEL | TYPE | |
|---|---|---|
| L 1 | | |
| L 2 | | |
| L 3 | PROCESS A | PROCESS B |
| L 4 | PROCESS C | |
| L 5 | PROCESS D | |
| ⋮ | | |
FIG. 3 (PRIOR ART)

| PROCESS | $T_0$ | | $T_1$ |
|---|---|---|---|
| TAKEN LOCK | L 5 | L 3 | L 4 |

| PROCESS | $T_0$ | $T_1$ |
|---|---|---|
| TAKEN LOCK | L 5 | L 4 |

| PROCESS | $T_0$ | $T_1$ |
|---|---|---|
| TAKEN LOCK | L 5 | |

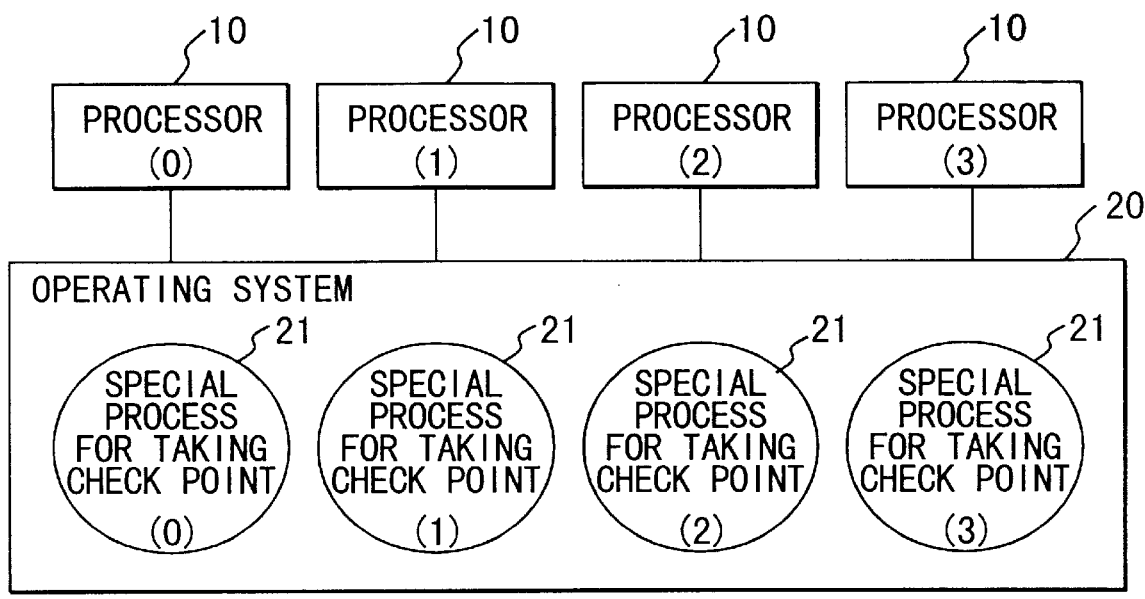
F I G. 1 3 A
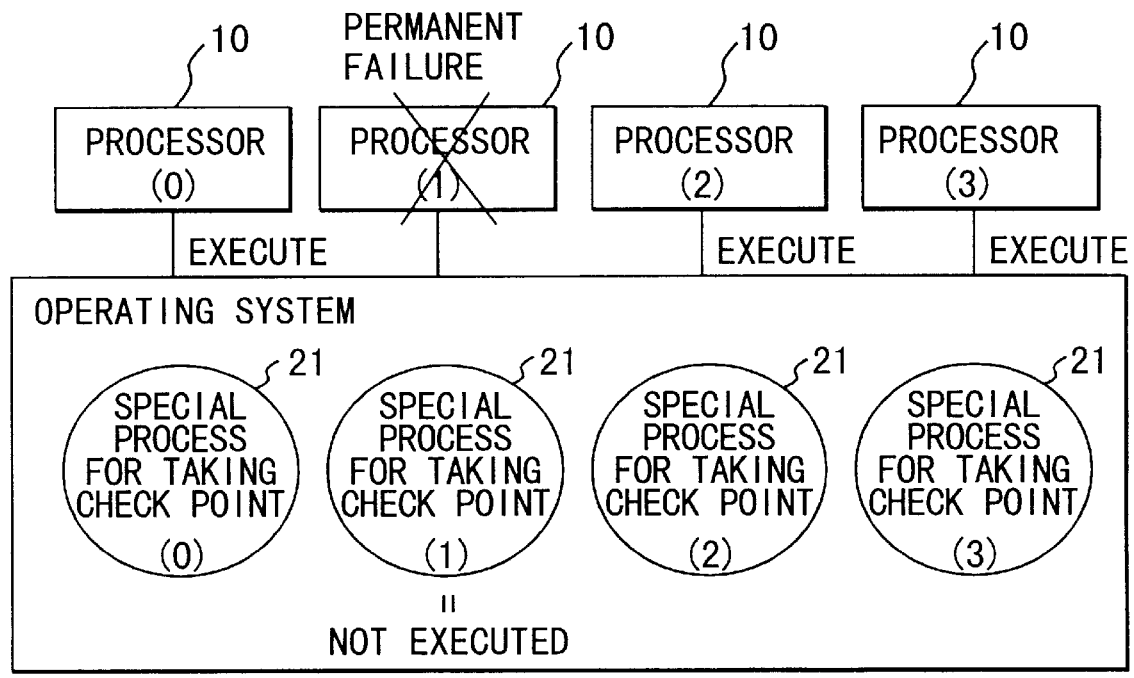
F I G. 1 3 B

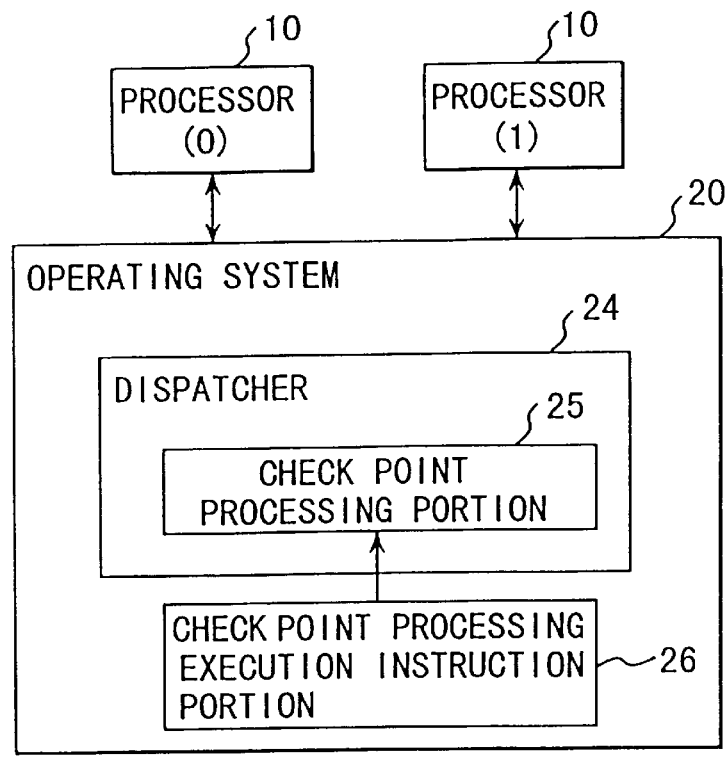
F I G. 14
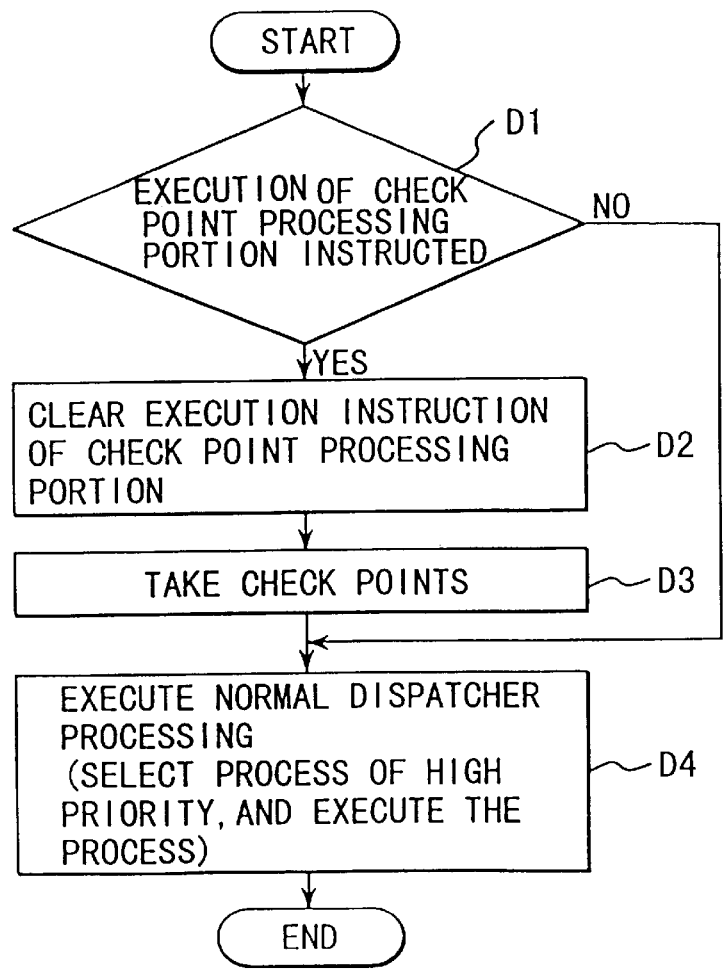
F I G. 15

COMPUTER SYSTEM HAVING A CHECKPOINT AND RESTART FUNCTION

BACKGROUND OF THE INVENTION

1. Field of the Invention

The present invention relates to a computer system having a check-point and restart function, and more particularly, to a computer system making it unnecessary to perform lock-run-out sequence at restart time since special process for taking check points is provided therein, and which can therefore be constructed at low cost.

The invention also relates to a computer system which comprises a multi-processor system having a check-point and restart function and in which, even if some of the processors incorporated in the multi-processor system fail to operate, the remaining possessors can operate continuously.

2. Description of the Related Art

A conventional computer system will be described, which is proceeding process while taking check points in a normally state and which is restarted from the last check point taken before a failure takes place, thereby to eliminate the failure.

In this computer system, process is executed while taking check points of the system during normal operation. Further, in the case where a failure or the like occurs, the system is returned to a point from a last check point taken.

These check points are taken in the following cases:

(1) where taking of a check point is clearly instructed in a code.

(2) where a predetermined time period has passed after the last check point is taken.

(3) where an event (interruption) occurs which demands taking of a check point.

The conditions as described above can occur at an arbitrary time point while executing a program. Conventionally, at the time when any of these conditions occurs, i.e., at an arbitrary time during execution of a program, the check points are taken.

FIG. 1 shows a state in which check-point processing is performed on a way while a processor executes normal processing. At time t1, in the interruption processing ((1) in FIG. 1) accompanying occurrence of an event which will demand taking of a check point during programs, check point processing ((2) in FIG. 1) is performed.

At time t2, the check point processing (i.e., (4) in FIG. 1) is performed during the timer interrupting process (i.e., (3) in FIG. 1) which is started upon a lapse of a predetermined time after the last check point has been taken. That is, the check points are taken during an arbitrary process.

FIG. 2 shows a state in which a failure occurs on the way of proceeding process while taking check points, and the process is re-executed from the last check point. If a failure occurs after check points are taken at the time t1 and time t2 ((1) in FIG. 2), the process is executed again from the check point (t2) taken last ((2) in FIG. 2).

In general cases, however, process normally includes "a processing portion to be treated as a certain set of units" in consideration of returning where a failure occurs. One of such processing portion is known as a "lock-run-out region".

The lock-run-out region means a block which must "run out" in failure recovery processing before the process recovers a regular condition in case where the system is started again from a check point taken during the region, although a check point can be taken therein. This is the block in which spin-lock is taken.

Process which is acquiring spin-locks cannot be preempted. When taking this spin-lock, attention must be paid such that no dead lock occurs. Normally, the system is designed, for convenience, such that a leveled lock class is added to each spin lock, and such that in the case where another spin lock is taken in a situation in which a spin lock has already been taken, only spin locks of those lock classes which are much lower than the lowest level among the levels of the lock classes of the spin lock which is presently taken. By controlling the acquisition of spin locks in this manner, the order of taking locks in each processor is guaranteed.

For example, in case where the levels of the lock classes are set as shown in FIG. 3, where "process A" and "process D" accompanied by lock operations are executed at the same time, and where both of the locks must be acquired overlapped at the same time, each processor must follows the order that a lock (level L5) of the "process D" is acquired, at first, and a lock of the "process A" is then taken.

The reason why it is necessary to make locks run out will now be explained with reference to FIGS. 4 and 5.

FIG. 4 shows an example in which a dead lock occurs since lock-run-out is not executed.

Here, it is assumed that a check point is taken in the situation that a process T0 and a process T1 are respectively executed in processors (0) and (1) and that the process T0 takes spin lock L5 and L3 while the process T1 takes the spin lock L4.

Further, consideration will be taken into a case in which a permanent failure thereafter occurs in a processor (0). In this case, the processor (1) is the only one processor which regularly operates, and therefore, the processes T0 and T1 must be executed by the processor (1). The spin locks which are currently acquired by the processes T0 and T1 can be recognized. However, it is not possible to predict how the processes T0 and T1 will then behave, i.e., how these processes will then acquire spin locks.

It is then supposed that recovery is executed and the process T0 which currently acquires a spin lock of a lower level is dispatched to the processor (1). Further, it is supposed that this process T0 releases the spin lock L3 which has already been acquired, and thereafter, is going to newly acquire a spin lock L4. However, since this spin lock L4 has already been acquired by the process T1 which had been executed before a failure occurred, the process T0 cannot acquire this spin lock eternally. Consequently, a dead lock occurs. This problem arises because the order of acquiring spin locks which has been guaranteed by each processor is broken since one processor is broken although the order of taking spin locks has been guaranteed by each processor.

A run-out function of a lock has been known as a method for solving this problem. This function operates to release all the spin locks acquired when a check point is taken before returning from the check point, and to bring all the processes into a condition not depending on any particular processor. This function operates in the following procedure.

(1) The one process is selected which has a spin lock of which level is lowest among levels of those spin locks which have been acquired, when taking a check point.

(2) A processor is assumed as the processor which has been carrying out the selected process, and the process is executed until the spin lock of this process is released.

(3) In the processing of releasing the spin lock, whether or not the process acquiring the spin lock still exists is investigated.

(4) If exists, the processing is repeated from the respect (1). If not, the processing of the lock-run-out is terminated.

Specifically, if spin locks are acquired as shown in FIG. 5A, the process T0 is selected at first (since the level of L3 is the lowest), and the process T0 is executed until the spin lock L3 is released.

In the next, the process T1 is selected which acquires L4 of which level is lowest (a s shown in FIG. 5B), and further, the process T0 is selected which acquires L5, after the releasing of the process T1 (as shown in FIG. 5C), thereby completing the lock-run-out. After the lock-run-out is completed, the system executes restarting.

In order to realize the lock-run-out processing executed in this procedure, the processing of releasing the spin-lock must be arranged so as to call a special dispatch mechanism during the lock-run-out processing.

Thus, in a conventional method of taking a check point, a processing portion such as a lock-run-out region is extracted in a software (OS: operating system), and the special dispatch mechanism as described above must be equipped in order to protect a "set of units" as also described above.

Therefore, if the manufacturing cost of the computer system unavoidably increases, the software installation will be limited.

SUMMARY OF THE INVENTION

An object of the present invention is to provide a computer system which makes it unnecessary to perform lock-run-out sequence at restart time by the special process for taking check points provided therein, and which can therefore be constructed at low cost.

Another object of the invention is to provide a computer system which comprises a multi-processor system having a check-point and restart function and in which, even if some of the processors incorporated in the multi-processor system fail to operate, the remaining possessors can operate continuously.

According to a first aspect of the present invention, a computer system is provided which comprises: at least one processor; at least one check point processing means, respectively corresponding to the at least one processor, for taking a check point used for restarting a process interrupted by a failure; interruption means for performing an interruption while executing the process, and for bringing the check point processing means into a ready state from a sleep state; dispatch means for dispatching the check point processing means brought into the ready state by the interruption means; and sleep state shift means for bringing the check point processing means into the sleep state again after the check point processing means dispatched by the dispatch means takes the check point.

Therefore, according to this invention, an interruption is carried out by the interruption means while executing the process, thereby bringing the special process for taking check points into the ready state from the sleep state. The dispatch means dispatches the special process for taking check points brought into the ready state by the interruption means, thereby taking check point. In this manner, when taking the check point, any other processes are not in a running state, and therefore, there is no possibility that a dead lock may occur.

After the check point is taken in the check point processing means dispatched by the dispatch means, the sleep state shift means sets the special process for taking check points into the sleep state again.

According to a second aspect of the present invention, a computer system is provided which comprises: at least one processor; a check point taking instruction means for instructing taking of a check point for restarting a process interrupted by a failure, where a check point taking condition is satisfied; check point taking means provided in a dispatcher of an operating system, for taking at least one check point corresponding to the at least one processor; execution ready means for rendering the check point taking means executable from a sleep state, where taking of a check point is instructed by the check point taking instruction means; dispatch means for dispatching the check point taking means rendered executable by the execution ready means; and sleep state shift means for bringing the check point taking means again into the sleep state after the check point is taken by the check point taking means dispatched by the dispatch means.

Therefore, according to this invention, the execution ready means brings the check point taking means into the ready state when taking of the check point is instructed by the check point taking instruction means. The dispatch means dispatches the check point taking means brought into the ready state by the execution ready means. In this manner, when taking the check point, any other processes are not in a running state, and therefore, there is no possibility that a dead lock may occur.

After the check point is taken in the check point taking means dispatched by the dispatch means, the sleep state shift means set the check point taking process into the sleep state again.

According to the invention, it is only the check point taking process that stays in the running state when check points are taken. Any other processes do not depend on the processor. Hence, even if the processor or processors of the multi-processor system happen to have a failure, reconfiguration (redaction (offline) of the processor) of the system can easily be achieved unless the special process for taking check points for the processor is performed.

Additional objects and advantages of the present invention will be set forth in the description which follows, and in part will be obvious from the description, or may be learned by practice of the present invention. The objects and advantages of the present invention may be realized and taken by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a diagram showing a state in which check point processing is executed on the way when a conventional computer system executes normal processing;

FIG. 2 is a diagram showing a state in which a failure occurs on the way when a conventional computer system proceeds processing while taking check points, and restarting is executed from the last check point;

FIG. 3 is a diagram showing a method of setting of levels of conventional lock classes;

FIG. 13A is a diagram showing a multi-processor system;

FIG. 13B is a diagram for explaining operation of the multi-processor system where a permanent failure occurs;

FIG. 14 is a diagram schematically showing the structure of the computer system according to a second embodiment of the present invention;

FIG. 15 is a flow chart showing the flow of a dispatcher comprising a check point processing portion;

DETAILED DESCRIPTION OF THE PREFERRED EMBODIMENTS

In the following, embodiments of the present invention will be explained with reference to the drawings;

First Embodiment

Figure 4:
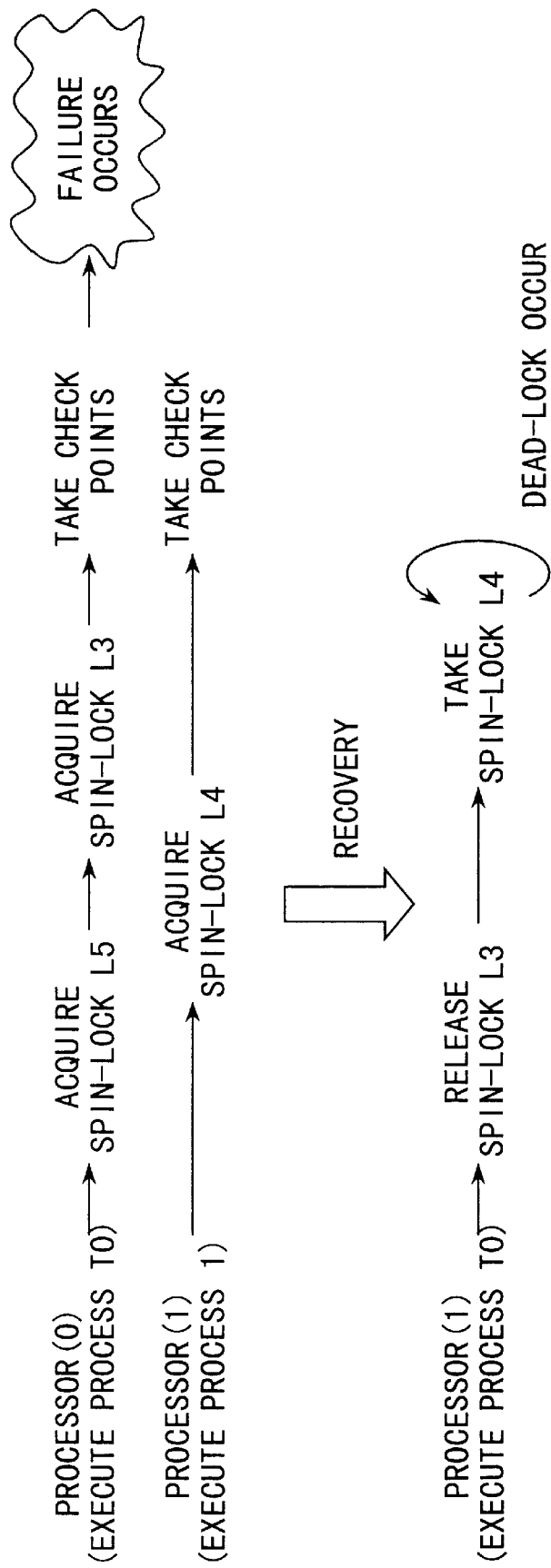
FIG. 4 is a diagram for explaining occurrence of a dead lock.
Figures 5A, 5B, 5C, 6:
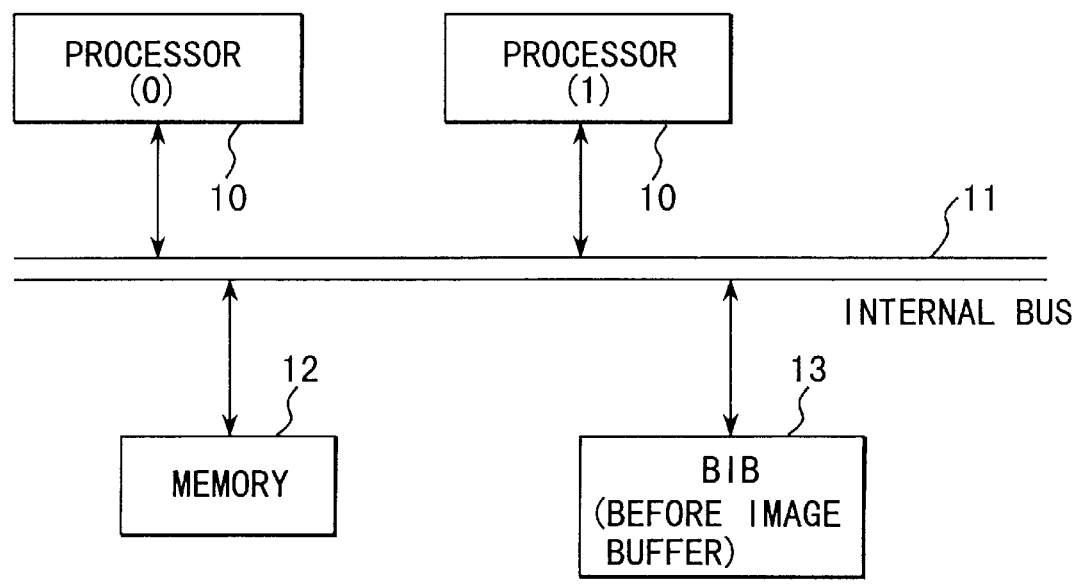
FIG. 5A is a diagram for explaining lock-run-out sequence.
FIG. 5B is a diagram for explaining lock-run-out sequence.
FIG. 5C is a diagram for explaining lock-run-out sequence.
FIG. 6 is a view schematically showing the hardware structure of a computer system according to a first embodiment of the present invention.

FIG. 6 is a diagram schematically showing the structure of a computer system according to the first embodiment of the present invention.

Reference 10 denotes a processor which is connected to an internal bus 11. In addition, this internal bus 11 is connected with a memory 12 and a BIB (Before Image Buffer) 13 for storing data before updating of the memory 12.

The memory 12 stores a software including an operating system (OS) to be executed by the processor.

Figure 19:
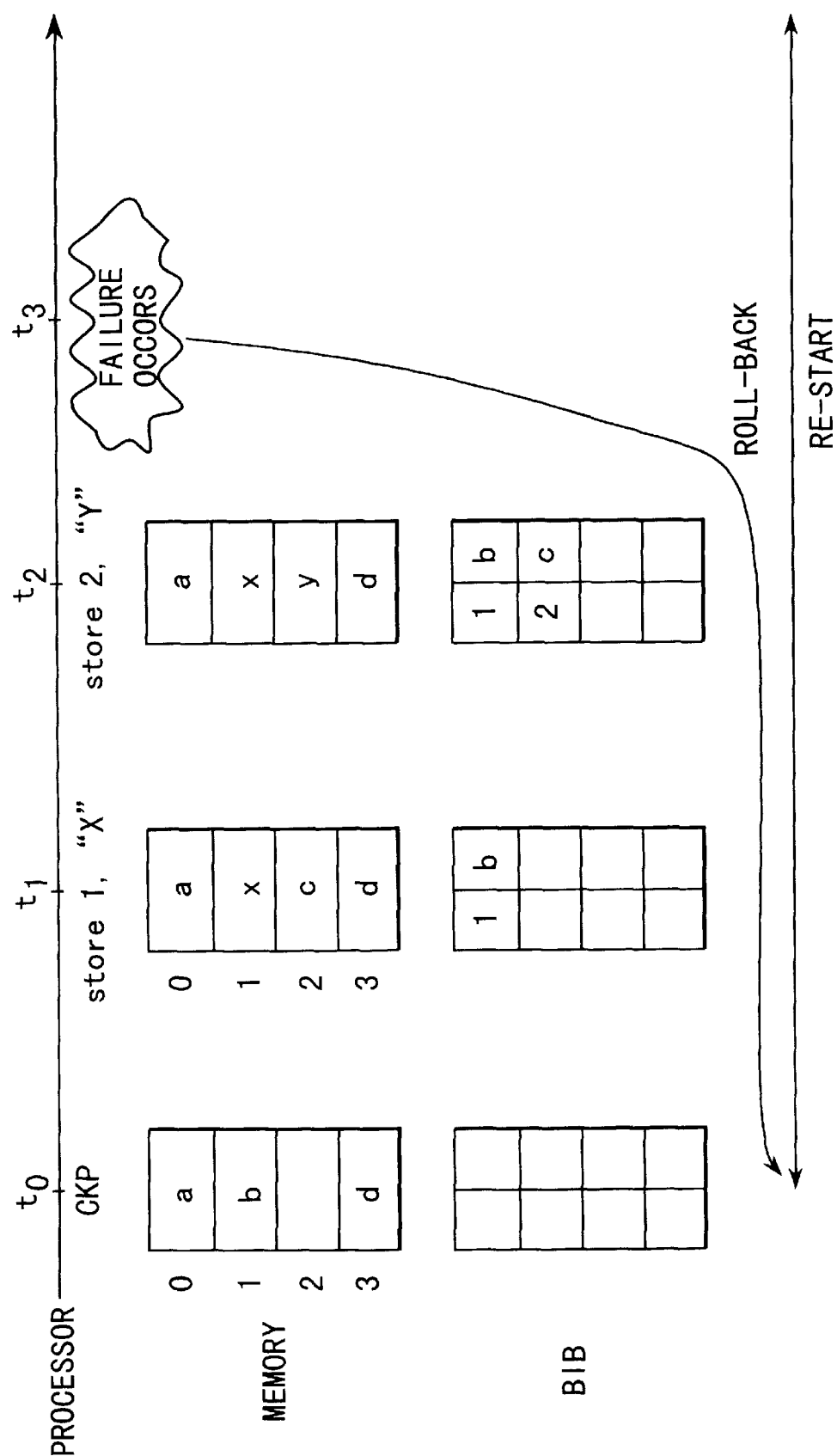
FIG. 19 is a diagram for explaining the check point/rollback function of the computer system.

FIG. 19 is a diagram for explaining the check point/rollback function of the computer system. As shown in FIG. 19, the contents of the address 0, 1, 2 and 3 of the memory are a, b, c and d, respectively, at time $t_0$. No data is stored in BIB. This state is regarded as "CKP."

Thereafter, at time $t_1$, the processor issues a command to store x in the address 1 of the memory. The content of the address 1 is thereby changed to x. At this time, BIB stores the data stored before the memory is renewed. This data shows that the content of the address 1 is b.

Then, at time $t_2$, the processor issues a command to store Y in the address 2 of the memory. BIB stores the data which shows that the content of the address 1 is b, before the content of the address 2 is rewritten to Y.

Assume a failure occurs thereafter, at time $t_3$. In this case, the memory can be rolled back to the memory state before renewing, that is, the state CKP which the memory assumed at time $t_0$, merely by storing the renewing data now stored in BIB is stored into the memory in the order reverse to the order in which the renewing data was stored into BIB.

Assume no failure occurs at time $t_3$. In this case, the data stored in BIB is cleared at an appropriate time, and the state the memory takes at this time is regarded as "CKP." Thus, CKP advances into the next generation.

Figure 7:
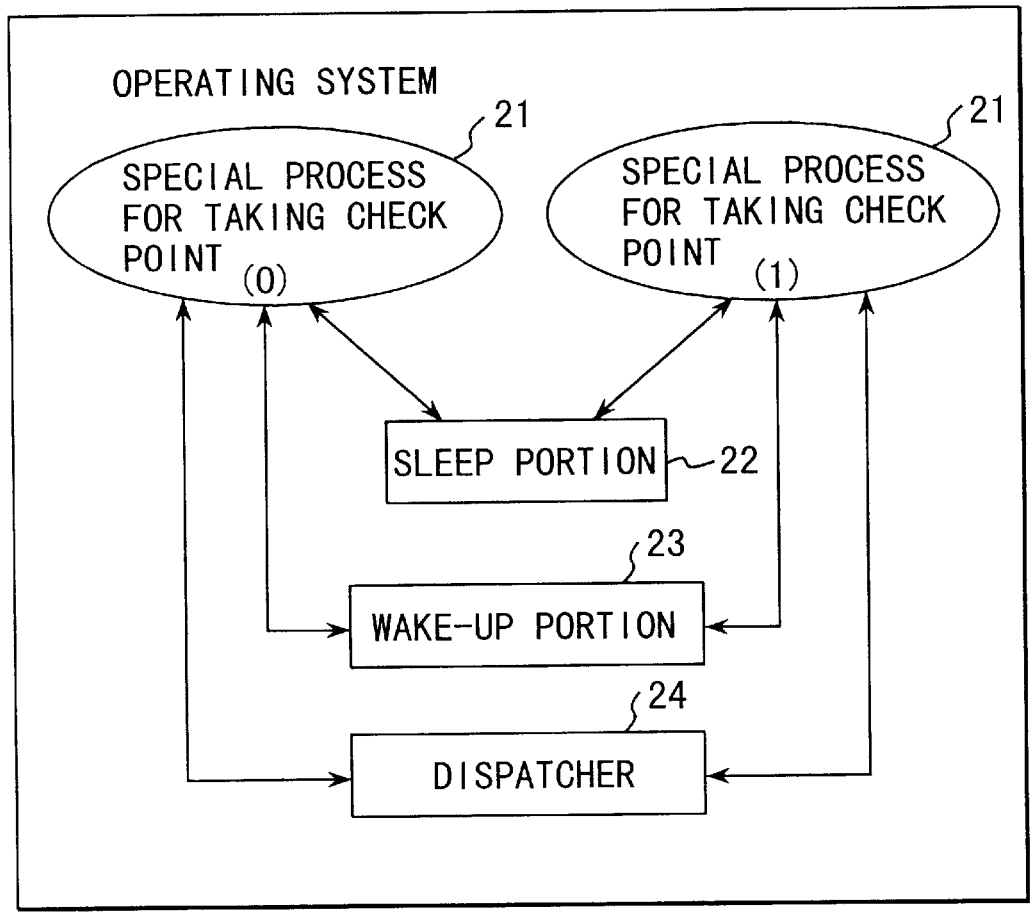
FIG. 7 is a function block diagram for explaining the function of a software stored in the memory of the computer system according to the first embodiment.

FIG. 7 is a function block diagram for explaining the function of the software stored in the memory 12.

Reference 21 denotes a special process for taking check points, and is normally maintained in a stand-by state by a sleep portion denoted by reference 22.

In case where check point taking conditions are satisfied, the special process for taking check points 21 in a stand-by state is rendered executable, with use of a wake-up portion denoted by reference 23.

The check point taking conditions are satisfied where a predetermined amount of data is stored into the BIB 13.

Note that the check point taking conditions are satisfied in the following cases.

(1) Where a predetermined amount of data is stored into an AIB (After Image Buffer) for storing image data after updating of the memory 12.

(2) Where taking of a check point is clearly instructed in a code.

(3) Where a predetermined time has passed after the last check point is taken.

The special process for taking check points 21 rendered executable is selected by the dispatcher 24. As a result of this, the special process for taking check points 21 is rendered executable, and check points are taken.

Where the check point taking conditions are satisfied, the priority (i.e., execution priority) of the special process for taking check points 21 are raised in order to take check points as soon as possible, so that interruptions other than special interruptions such as a failure notifications and the likes might not be received.

In the next, operation will be explained with reference to FIGS. 8 to 10.

Figure 8:
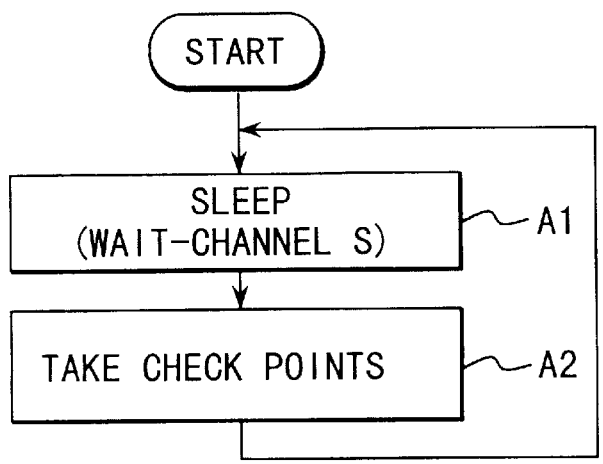
FIG. 8 is a flow chart showing the flow of the processing of the special process for taking check points.

FIG. 8 is a flow chart showing the flow of the processing of the special process for taking check points 21.

The special process for taking check points 21 is normally maintained in a stand-by state (in a step A1). However, once the check point taking conditions are satisfied, this process 21 is waken up by the wake up potion 23, and is rendered executable.

Then, the special process for taking check points is dispatched by the dispatcher 24, thereby a check point is taken by the special process for taking check points (in a step A2). Thereafter, the process is brought back into a stand-by state.

Figure 9:
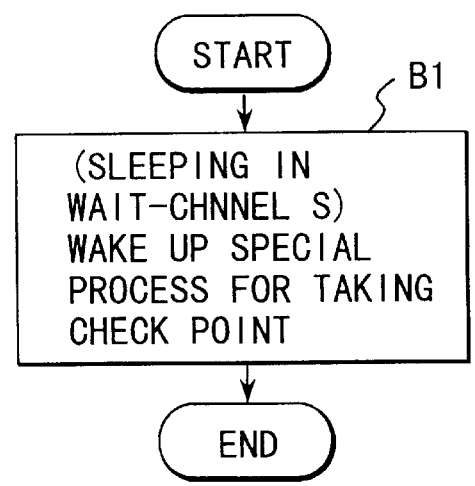
FIG. 9 is a flow chart showing the flow of processing for waking up the special process for taking check points.

FIG. 9 is a flow chart showing the flow of processing for notifying satisfaction of check point taking conditions, and for waking up the special process for taking check points 21 maintained in a stand-by state.

As is apparent from FIG. 9, processing for notifying satisfaction of check point conditions is executed (in a step B1) by interruption processing or sub-routine call, if the check point taking conditions are satisfied. Here, the special process for taking check points 21 is rendered in a stand-by state.

In the transfer of the special process for taking check points 21 into a stand-by state, and in the transfer into an executable state, only specified processes are performed. For example, in the UNIX, operating system only one specified wait channel (S in this case) is used to specializing the processes for waking up.

Figure 10:
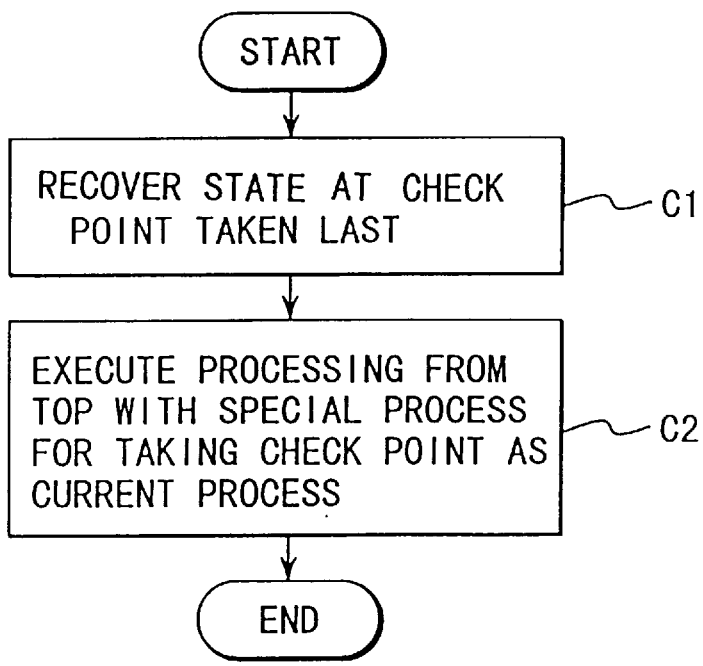
FIG. 10 is a flow chart showing the flow of the processing where restarting is executed from a last check point taken by the special process for taking check points.

FIG. 10 is a flow chart showing the flow of processing which restarting is executed from a check point taken by the special process for taking check points 21.

In this case, the state of the last check point taken by the special process for taking check points 21 is recovered (in a step C1), and subsequently, the processing is carried out from the top of the special process for taking check points 21, with this special process for taking check points 21 taken as the current process (in a step C2). Alternatively, the context of the special process for taking check points, which is stored at the check point, may be recovered.

In the next, operation of the computer system according to the present embodiment will be explained with reference to FIGS. 6 to 12.

Figure 11:
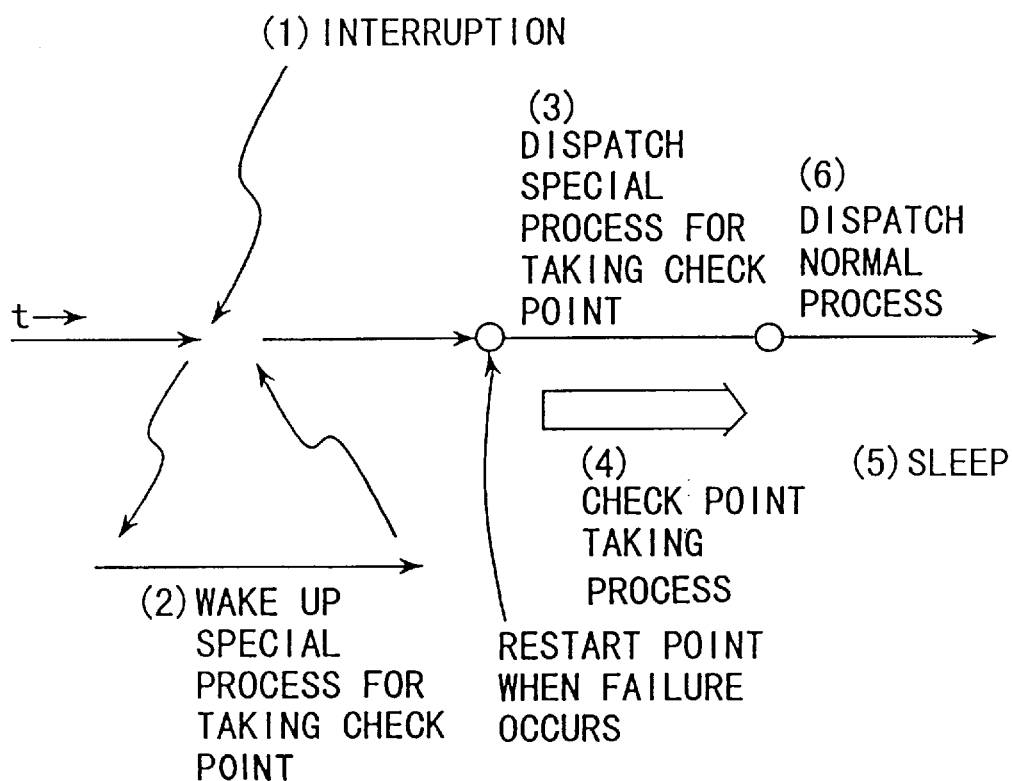
FIG. 11 is a diagram for explaining operation of the computer system according to this embodiment.

FIG. 11 is a diagram for explaining operation of the computer system according to this embodiment.

When the data amount of the data before updating of the memory 12 stored in the BIB 13 reaches a predetermined data amount while the processor executes an arbitrary process x, the BIB 13 supplies the processor 10 with a check point gathering request interruption.

Here, the BIB 13 supplies the processor (1) with an interruption. If the processor (1) is supplied with an interruption from the BIB 13, the processor (1) temporarily suspends the processing of the process x being executed, and carries out interruption processing ((1) in FIG. 1)

In this interruption processing, all the special process for taking check points 21 maintained in a stand-by (sleep) state are brought into an executable state (or a ready state) ((2) in FIG. 11).

Figure 12:
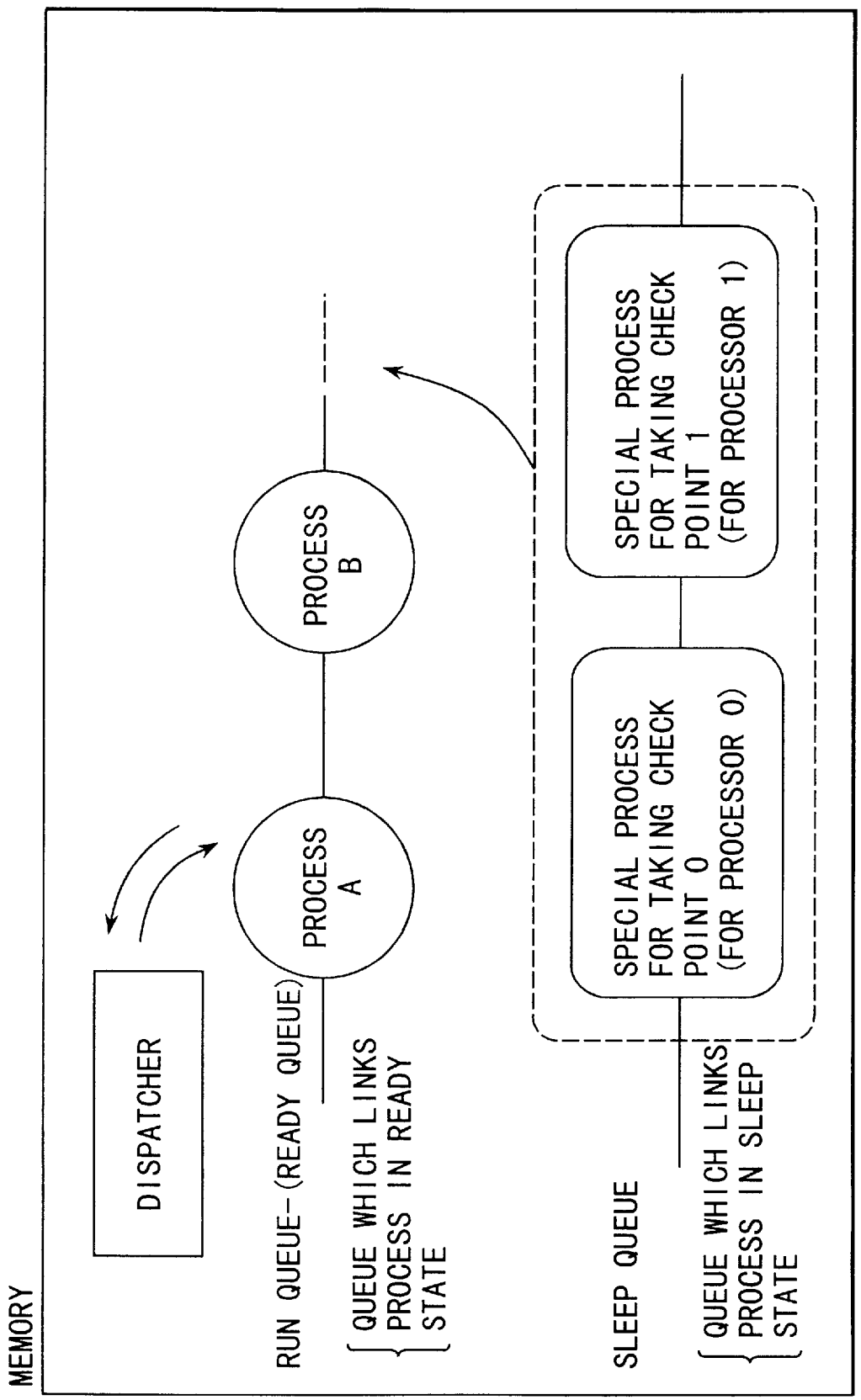
FIG. 12 is a diagram for explaining the case which the special process for taking check points in a sleep state is brought into a ready state.

FIG. 12 is a diagram for explaining the case where a special process for taking check points maintained in a sleep state is brought into a ready state.

In this case, the priority (execution priority) of the special process for taking check points is raised, and is arranged such that interruptions other than fault notifications and the likes are not received.

Upon completion of interruption processing, the processor (1) executes again the process x temporarily suspended, and subsequently, the dispatcher is called ((3) in FIG. 11) when one execution unit of the process x is completed. The calling of the dispatcher is performed by time sharing processing control or the like.

The dispatcher detects a process of a high priority, and brings this process into a running state, so that the process is executed by the processor. Here, since a special process for taking check points is waken up, the dispatcher selects the special process for taking check points 21 and makes the processor execute this process, thereby to take a check point ((4) in FIG. 11).

Since taking of the check point is carried out in a conventional computer system in interruption processing of an arbitrary process, there is a possibility that the process includes a spin lock or the process has an access with a resource dependent on the processor. Therefore, there is a possibility that a dead lock occurs.

In contrast, to a conventional computer system, a check point is taken by a special process for taking check points dispatched by the dispatcher, any other processes are not in a running state. Therefore, a dead lock does not occur when restarting is performed, unlike in a conventional computer system.

Further, when taking of a check point is completed, the special process for taking check points 21 is brought into a stand-by (or sleep) state again ((5) in FIG. 11), and the dispatcher is called. An arbitrary normal process is selected again ((6) in FIG. 11).

Thus, in case of using the special process for taking check points 21, obtaining of the check point is always carried out in the special process for taking check points 21.

Therefore, lock-run-out at the restarting is no longer necessary, and the operating system including a check point taking function can be greatly simplified. As a result of this, construction costs can be greatly reduced.

In addition, since the structure is arranged in this manner, the following effects can be obtained.

FIG. 13A is a diagram showing a multi-processor system. This example is based on a multi-processor system having four processors (0) to (3), and each of the processor 10 dispatches and performs a special process for taking check points 21 corresponding to the processor, when a check point is taken.

More specifically, in the multi-processor system a check point is taken in one of the following two alternative methods:

(1) The processors which depend on one another with respect to the data they process are operated together in synchronism to take check points.

(2) All processors provided in the system are operated in synchronism to take a check point.

Generally, The second method is employed in most cases—that is, all processors are in synchronism because it is difficult to manage data relationship between the processors and overhead is large.

Hence, all processors are operated in synchronism to take a check point, as shown in the first embodiment of the present invention.

This means that the process being executed when obtaining a check point is only the special process for taking check points 21, and any other processes are not being executed.

Here, for example, it is supposed that an intermittent failure occurs in a particular processor 10. In this case, in a failure recovery processing, the state of the system is rolled back to the check point taken last, and then, the special process for taking check points 21 which was executed by each of the processors when the check point was taken is resumed.

In the next, with reference to FIG. 13B, consideration will be taken into a case in which a permanent failure occurs in a particular processor 10. In this case, in failure processing, the state of the system if rolled back to the check point taken last, and then, the special process for taking check points 21 which was executed by each of the processors when the check point was taken is resumed.

However, the processor 10 (or the processor (1) in FIG. 13B) which causes the permanent error cannot execute the process. As a result, the special process for taking check points 21 cannot be executed by any of the processors, and any other normal processes cannot be dispatched by the failure processor. Therefore, separation (redaction (offline), reconfiguration) of the processor causing the permanent failure can be easily realized.

Second Embodiment

FIG. 14 is a diagram schematically showing the computer system according to the second embodiment of the present invention.

Reference 10 denotes a processor and executes a software including the operating system denoted by reference 20.

Reference 24 denotes a dispatcher and includes a check point processing potion denoted by reference 25.

The dispatcher 24 does not always call the check point processing portion 25, but calls the portion 25 only when the check point processing execution instruction portion instructs execution of check point processing. Further, when the check point taking conditions are satisfied, execution of the check point processing is instructed by the check point processing execution instruction portion 26.

When execution of the check point processing is instructed by the check point processing execution instruction portion 26, the dispatcher 24 calls the check point processing portion 25.

In the instruction of execution of the check point processing, for example, a parameter in a software is used as a flag, and the flag is set when execution of the check point processing is instructed (1). Therefore, the dispatcher 24 calls the check point processing portion 25 only when the flag is set (1).

In the next, the operation procedure according to this embodiment of the present invention will be explained with reference to FIGS. 15 to 17.

FIG. 15 is a flow chart showing the flow of processing of the dispatcher 24 comprising the check point processing portion 25.

The dispatcher 24 comprising the check point processing portion 25 monitors whether or not an instruction from the check point processing execution instruction portion 26 is notified (in a step D1). If execution of the check point processing portion 25 is instructed, the dispatcher 24 clears an execution instruction of the check point processing portion 25 (in a step D2), and thereafter, gathering of check points is carried out (in a step D3).

Further, when the gathering is completed, processing of a normal dispatcher is executed (in a step D4). Specifically, the process of a high priority is selected and the processor is made execute the process.

Figure 16:
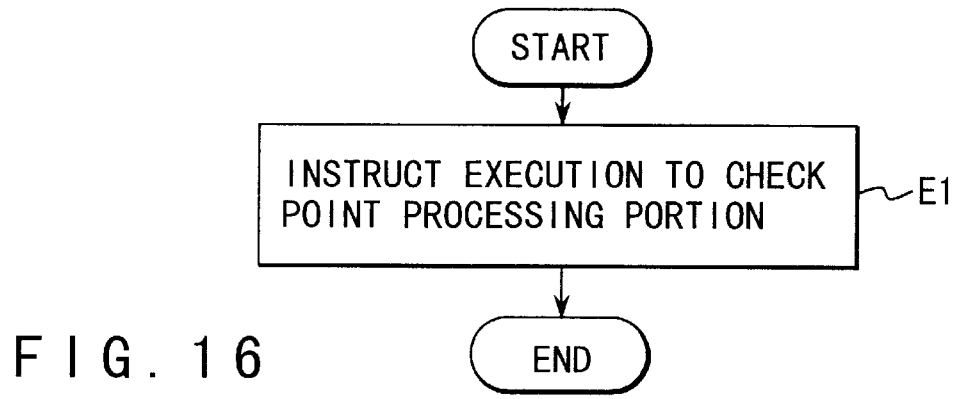
FIG. 16 is a flow chart showing the flow of the processing for instructing the dispatcher so as to execute a check point processing portion.

FIG. 16 is a flow chart in which satisfaction of check point taking conditions is notified, and in which execution of the check point processing portion 26 is instructed to the dispatcher 24.

When the check point taking conditions are satisfied as shown in FIG. 16, processing of notifying satisfaction of the check point taking conditions is executed, by interruption processing or sub-routine calling (in a step E1). Here, execution of the check point processing portion 25 is instructed.

In the execution instruction of the check point processing portion 25, for example, the parameter in a software is used as a flag, as described above, and the flag is set when instructing execution of the check point processing portion 25. Therefore, the dispatcher 24 calls the check point processing portion 25 only when the flag is set (1).

Figure 17:
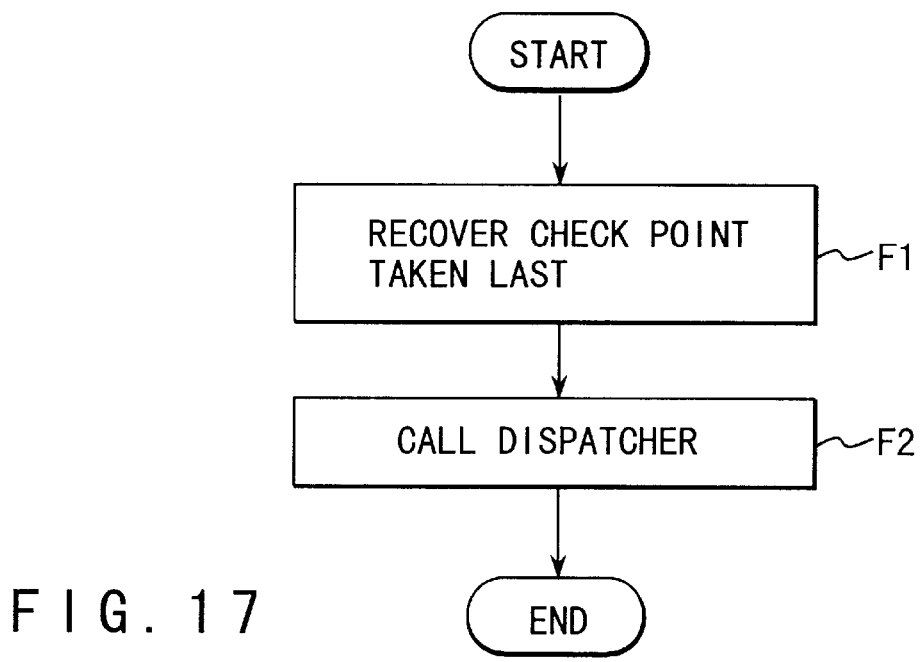
FIG. 17 is a flow chart showing the flow of the processing which restarting is executed from a last check point taken by a check point processing portion.

FIG. 17 is a flow chart showing the flow of processing in which returning is performed from a check point taken by the check point processing portion 25.

In this case, the state at the check point taken last is recovered at first (in a step F1), and subsequently, the dispatcher 24 is called from the top (in a step F2).

Here, operation of the computer system according to the present embodiment will be explained with reference to FIG. 18.

Figure 18:
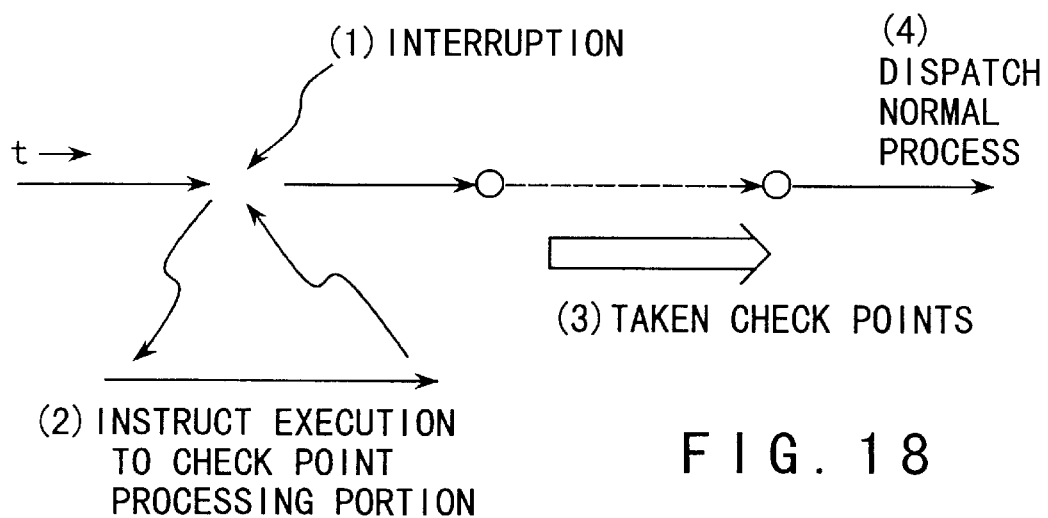
FIG. 18 is a diagram for explaining operation of a computer system according to this embodiment.

If an interruption notifying that the check point taking conditions are satisfied occurs while the processor executes an arbitrary process ((1) in FIG. 18), execution of the check point processing portion 25 is instructed through the check point processing execution instruction portion 26 ((2) in FIG. 18).

Thereafter, the control returns to the original process, and one execution unit is completed. Subsequently, the dispatcher is called. However, since execution of the check point processing portion 25 has been instructed, the dispatcher 24 carries out taking of a check point ((3) in FIG. 18).

When taking of this check point is completed, the dispatcher 24 returns to normal processing, i.e., the dispatcher selects a process of a high priority, and makes the processor 10 execute the process.

Thus, when the dispatcher 24 comprising the check point processing portion 25 is used, obtaining of the check point is executed only in the dispatcher, and therefore, lock-run-out is unnecessary when restarting is performed. Accordingly, the operating system including the check point taking function can be greatly simplified, and the construction costs can be greatly reduced.

Therefore, according to the computer systems of the present invention, check points are taken only in the check point processing means or in the dispatcher. As a result, any other processes cannot be executed when taking the check point, and the "set of units" need not be considered any more which otherwise must be considered in a convention al method of taking check points. Thus, the operating system can be greatly simplified. As a result, construction costs or improvement costs can be greatly reduced.

In the multi-processor system, even if a processor or processors of the multi-processor system happen to have a failure, reconfiguration (redaction (offline), or separation of the processors having a failure) of the system can easily be achieved, merely by inhibiting the check point processing for any process or having a trouble.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system which comprises:
    at least one processor including:
        at least one check point taking special process means for taking a check point used for restarting a process interrupted by a failure, wherein said check point taking special process means is normally maintained in a sleep state;
        interruption means for performing an interruption while executing the process, and for bringing said at least one check point taking special process means into a ready state from the sleep state;
        dispatch means for dispatching said at least one check point taking special process means brought into the ready state by said interruption means; and
        sleep state shift means for bringing said at least one check point taking special process means into the sleep state again after said at least one check point taking special process means dispatched by said dispatch means takes the check point.

2. The computer system according to claim 1, wherein interruption processing of said interruption means is performed after a check point taking condition is satisfied.

3. The computer system according to claim 2, wherein the check point taking condition is satisfied where taking of a check point is instructed in a code of said processor.

4. The computer system according to claim 2, wherein the check point taking condition is satisfied when a predetermined time has passed after the check point is taken by said at least one check point taking special processing means.

5. The computer system according to claim 2, wherein the check point taking condition is decided by the amount of data stored in a BIB (Before Image Buffer) for gathering image data before updating of a memory.

6. The computer system according to claim 2, wherein the check point taking condition is decided by the amount of data stored in an AIB (After Image Buffer) for gathering image data after updating of a memory.

7. The computer system according to claim 1, wherein dispatching said at least one check point taking special processing means by said dispatch means is performed by time sharing processing.

8. The computer system according to claim 1, which further comprises recovery means for recovering a state of said process at a check point taken last by said at least one check point taking special processing means, when an intermittent failure occurs in any of said at least one processor.

9. The computer system according to claim 8, which further comprises processing means for processing said at least one check point taking processing means as a current process after a state of the process is recovered by said recovery means.

10. The computer system according to claim 1, which further comprises recovery means for performing recovery in a manner in which, when a permanent failure occurs in any of said at least one processor, another processor than said processor including the permanent failure recovers a state of the process at the check point taken last by said at least one check point taking special processing means.

11. The computer system according to claim 10, which further comprises processing means for, after a state of the process is recovered by said recovery means, processing said at least one check point taking special processing means regarded as a current process by another processor than the processor including permanent failure.

12. A computer system which comprises:

at least one processor;

a check point taking instruction means for instructing taking of a check point for restarting a process interrupted by a failure, where a check point taking condition is satisfied;

check point special taking means provided in a dispatcher of an operating system, for taking at least one check point used for restarting a process interrupted by a failure, said check point special taking means corresponding to said at least one processor, wherein said check point special taking means is normally maintained in a sleep state;

execution ready means for rendering said check point special taking means executable from sleep state, where taking of a check point is instructed by said check point taking instruction means;

dispatch means for dispatching said check point special taking means rendered executable by said execution ready means; and sleep state shift means for bringing said check point special taking means again into the sleep state after the check point is taken by said check point special taking means dispatched by said dispatch means.

13. The computer system according to claim 12, wherein the check point taking condition is satisfied where taking of a check point is instructed in a code of said processor.

14. The computer system according to claim 12, wherein the check point taking condition is satisfied when a predetermined time has passed after a check point is taken by the check point taking means.

15. The computer system according to claim 12, wherein the check point taking condition is decided by a amount of data stored in a BIB for gathering data before updating of a memory.

16. The computer system according to claim 12, wherein the check point taking condition is decided by a amount of data stored in an AIB for gathering data after updating of a memory.

17. The computer system according to claim 12, wherein dispatching said check point special taking means by said dispatch means is performed by time sharing processing.

18. The computer system according to claim 12, further comprising recovery means for recovering a state of said at least one processor at a check point taken last by said check point special taking means, when an intermittent occurs in any of said at least one processor.

19. The computer system according to claim 18, further comprising processing means for processing said check point special taking means as a current process after a state of the processor is recovered by said recovery means.

20. The computer system according to claim 12, further comprising recovery means for performing recovery in a manner in which, when a permanent failure occurs in any of the at least one processor, another processor than the processor including the permanent failure recovers a state of the processor at the check point taken last by said check point special taking means.

21. The computer system according to claim 20, further comprising processing means for, after a state of the processor is recovered by said recovery means, processing said check point special taking means regarded as a current process by other processor than the processor including permanent failure.

* * * * *

UNITED STATES PATENT AND TRADEMARK OFFICE
CERTIFICATE OF CORRECTION

PATENT NO. :
DATED :
INVENTOR(S) :

5,884,021
March 16, 1999
Hirayama et al.

It is certified that error appears in the above-identified patent and that said Letters Patent is hereby corrected as shown below:

On the Title Page, Item [57], in the Abstract, line 9, "an ready" should read --a ready--.

\* Claim 9, column 11, line 28, after "taking", insert --special--.

Claim 15, column 12, line 22, "a amount" should read --an amount--.

Claim 16, column 12, line 26, "a amount" should read --an amount--.

Signed and Sealed this

Twenty-fifth Day of January, 2000

Attest:

Attesting Officer

*Acting Commissioner of Patents and Trademarks*